March 7, 1967  S. D. NOREM ETAL  3,307,333
CHROMATOGRAPHIC COLUMNS
Filed Oct. 31, 1963
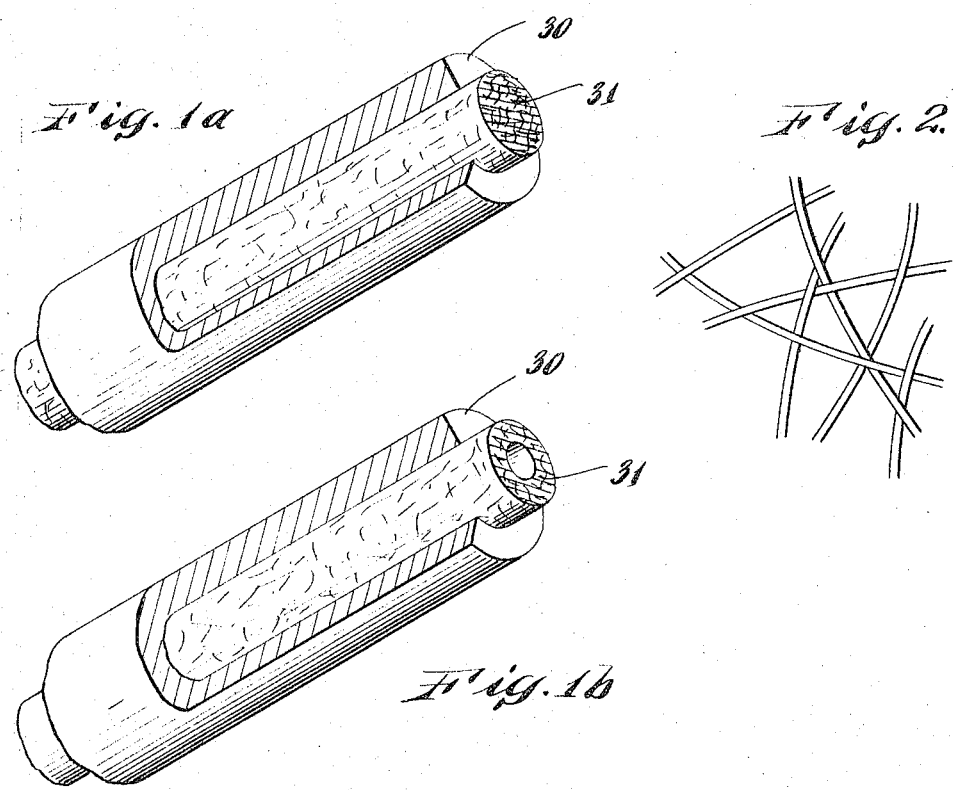
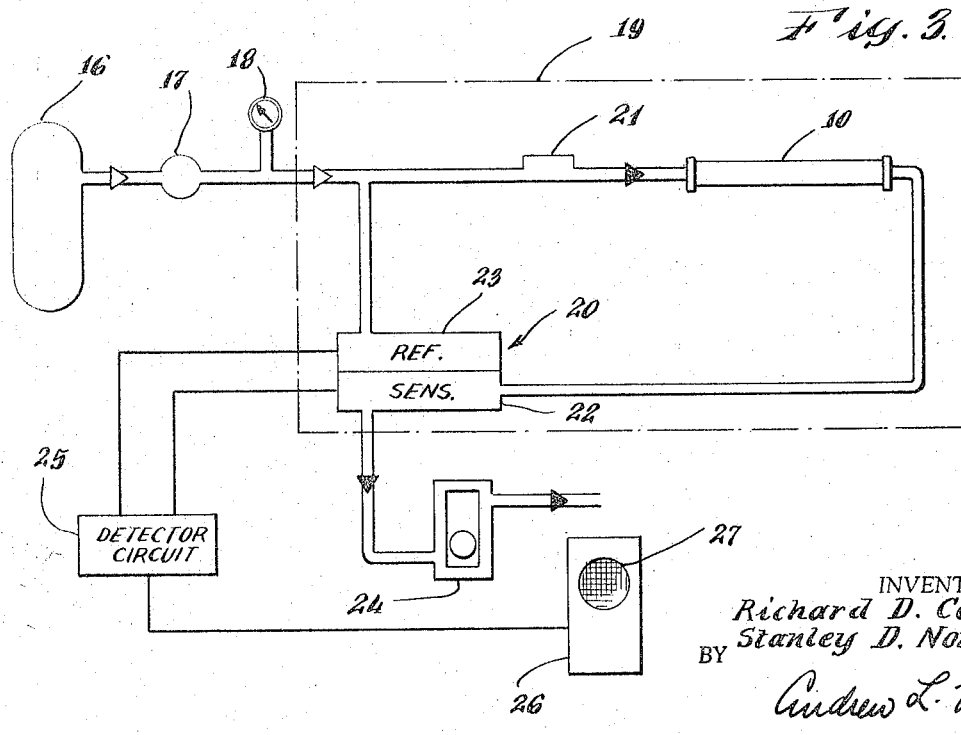
INVENTORS.
Richard D. Condon
Stanley D. Norem
BY
Andrew L. Upy
ATTORNEY.

United States Patent Office 3,307,333
Patented Mar. 7, 1967

3,307,333
CHROMATOGRAPHIC COLUMNS
Stanley D. Norem, Bayside, N.Y., and Richard D. Condon, Ridgefield, Conn., assignors to The Perkin-Elmer Corporation, Norwalk, Conn., a corporation of New York
Filed Oct. 31, 1963, Ser. No. 320,464
9 Claims. (Cl. 55—197)

General

The present invention relates to chromatography apparatus and more particularly to a unique chromatographic column.

The chromatography technique consists essentially in passing a sample mixture through a column and utilizing the different equilibria existing between a fixed phase in the column and the respective components of the sample in the mobile phase to separate the sample components. While the fixed phase can be liquid or solid, the mobile phase can be gas or liquid. It is possible to use a number of different combinations in order to separate the components of a sample. For instance, one may use a gas-liquid combination, a gas-solid combination, a liquid-liquid combination or a liquid-solid combination. Whole the present invention will be described with particular reference to gas chromatography, that is, the gas-liquid combination or the gas-solid combination, it will be obvious that the principles underlying the present invention may be equally applied to liquid chromatography, that is, the liquid-liquid combination or the liquid-solid combination.

Commercially available chromatographic columns fall generally into two categories: the packed columns and the capillary or more commonly called Golay columns. The packed columns may comprise a length of hollow tubing packed with an inert material such as celite or kieselguhr. The packing acts as a supporting structure for a liquid such as squalane, which is the fixed phase and operative component in the column. Such a column is used for effecting gas-liquid separation by the elution-partition technique. The liquid or fixed phase is commonly known as the partitioning agent. The column which is used in gas-solid or elution-adsorption separation is, by comparison, filled with a moderately adsorptive solid material such as silica gel in powder form and the packing material itself is the operative component in the column.

A typical packed column of either of the two types just described may be constructed of ¼" stainless steel or glass tubing in lengths of one or two meters. Some columns are formed in a U-shape or W-shape while other columns are curved into a substantially helical configuration.

For a packed column, the resolution per unit length is dependent upon the average particle diameter; the smaller the particle diameters, the higher the resolution. This is so because the fluid passages become small. However, small fluid passages result in greater pressure drops thus making greater demands on the carrier supply.

The capillary or Golay column has no packing material. In one form, a hollow tube is internally coated with a partitioning agent. For gas-liquid separation, the column is internally coated with a film of partitioning agent of the kind supported on the celite structure of a packed column. For gas-solid separation, the column is internally coated with an adsorbent material which may be in powder form. Another form of the capillary or Golay column for gas-liquid separation comprises a hollow tube, the internal walls of which support a small thickness of loosely aggregrated dendritic particles which are coated with a film of partitioning agent.

The Golay column has been found to provide excellent analytical separation of the components of a sample. However, in certain applications where such a column is designed to provide high resolution and short analysis time it may become necessary to limit the sample size. Small samples make it difficult to collect eluting fractions for subsequent study and place a greater demand on detector sensitivity.

It is, therefore, an object of the present invention to provide a new and improved chromatographic column.

A chromatographic column constructed in accordance with the present invention comprises a hollow member and a randomly intertwined structure of fibers positioned within the hollow member for which the different components of a mixture to be analyzed have different attractions.

For a better understanding of the present invention, together with other and further objects thereof, reference is had to the following description, taken in connection with the acompanying drawing, and its scope will be pointed out in the appended claims.

Referring to the drawing:

FIGURES 1a and 1b are cutaway views of two forms of chromatographic columns;

FIGURE 2 is a greatly enlarged representation of a fibrous structure used in constructing a chromatographic column in acordance with the present invention; and FIGURE 3 is a schematic illustration of a gas chromatographic system which may utilize a chromatographic column constructed in accordance with the present invention.

Description and operation of chromatographic system

Referring to FIGURE 3, a source of carrier gas 16 which may be helium under pressure is connected through suitable gas regulation means 17 to the input side of the system. A pressure gauge 18 is connected to the input of the carrier gas to indicate gas pressure.

The carrier gas flows by a sample injector 21, of conventional construction and operation, whereat a sample is injected into the moving stream of carrier gas. The sample and carrier gas, commonly called the mobile phase, are introduced into a chromatographic column 10, constructed in accordance with the present invention, whereat the components of the sample are separated. The particular construction of the chromatographic column 10 will be described in detail below. The various components of the sample emerge or elute from the chromatographic column 10 at different times in accordance with their respective physical characteristics.

The chromatographic system of FIGURE 3 also includes a detector 20 comprising a sensing section 22 and a reference section 23. The sensing section 22 detects thermal conductivity changes of the carrier gas due to the presence of components of the sample as they elute from the chromatographic column 10. The reference section 23 is connected to respond to the carrier gas input and, thus, is capable of providing a reliable reference which will vary commensurately with the carrier gas input to the system. It is obvious that other appropriate means, such as a flame ionization detector, may be employed to detect the components eluting from the column 10. The detector 20, sample injector 21 and chromatographic column 10 are seen enclosed within a temperature controlled chamber 19 which may be of the thermostatted air bath type.

The sample components are passed from the sensing side 22 of detector 20 through a flow meter 24 and may be either disposed of as waste or accumulated in an appropriate collecting system, if further analysis is desired.

The reference side 23 and the sensing side 22 of the detector 20 are connected to an appropriate electrical detector circuit 25 which may comprise a balanced bridge of the Wheatstone type. The electrical output signal of the bridge circuit is commensurate with the difference between the thermal conductivity of the vapor passing through the sensing side 22 of the detector 20 and the thermal conductivity of the carrier gas and is, therefore, indicative of the separated components of the sample as they elute from the chromatographic column 10. The output signal from the bridge circuit may be fed to a recorder or to a cathode ray oscilloscope 26 as illustrated in FIGURE 3. In the latter case, the fractograms appear in the form of a visual display on the face of the cathode ray tube.

*Description and operation of chromatographic column*

FIGURES 1a and 1b are cutaway views of two forms of chromatographic columns constructed in accordance with the present invention. Such a column includes a hollow member 30 which may be made of a metal or glass or other suitable supporting material. Hollow member 30 may be a tubular piece one to two meters in length and ¼" in diameter for example. The actual dimensions would be dependent upon various design considerations.

A chromatographic column constructed in accordance with the present invention also includes a randomly intertwined structure of fibers 31 positioned within the hollow member 30. The physical configuration of the fibrous structure 31 of FIGURE 1a is seen to be a solid cylinder which occupies the entire inside volume of tubular member 30. The physical configuration of the fibrous structure 31 of FIGURE 1b is seen to be a cylinder with a central passage running along its entire length. The outside dimensions of both of the fibrous structures of FIGURES 1a and 1b are substantially the same as the inside dimensions of the tubular member.

FIGURE 2 is a greatly enlarged representation of the fibrous structure 31 and shows how the fibers may be intertwined. While various fibrous materials may be used in chromatographic column applications, metallic fibers which are capable of being processed into a rigid structure have worked successfully. Fibers of prescribed diameter and length, possibly as fine as the microns, are processed into felts either by a slurry or mechanical felting technique. The result is a randomly intertwined structure such as that shown in FIGURE 2. The specific density of the structure is, again, dependent upon various design considerations.

The felting may be followed by sintering the structure to cause bonding or interlocking along the fibers at their points of intersection with other fibers. This results in a rigid truss-like structure of prescribed density.

Next, the truss-like structure may be cut or machined to a proper size and configuration. As indicated above, two possible configurations are a solid cylinder which completely occupies the inside volume of tubular member 30 and a cylinder having a central passage. It will be obvious that the interlocked structure 31 may take other forms or configurations with different dimensions relative to the dimensions of hollow member 30.

Finally, the interlocked structure 31 is provided with a substance for which the different components of a mixture under analysis have different attractions. This substance, in the form of a coating may be the customary adsorptive material or liquid partitioning agent used in packed or Golay columns. When the chromatographic column of the present invention is to be used in liquid chromatography, the fibers may be coated with an ion exchange resin such as sulfonated polystyrene.

It should be pointed out the various fibrous materials may have the requisite characteristics to show different affinities between the fibrous structure and the different components of a mixture under analysis. In such a case it would not be necessary to coat the fibers. As previously indicated, moderate adsorptive solid material is silica gel.

A fiber structure presently available commercially and suitable for use in the present invention is sold under the trademark FELTMETAL.

An examination of FIGURE 2 shows that a randomly interlocked structure of fibers may be made of relatively low density. This results in relatively large fluid passages which reduce the pressure drops along the column length. Because the fibers are relatively fine, high resolution is possible. Ordinarily, in conventional packed columns, for example, resolution is increased by reducing the diameters of the packing material. This results in tighter packing and smaller fluid passages. Due to the interlocked structure of the present invention the fine fibers which contribute to high resolution are held apart by each other thereby creating relatively large fluid passages.

While there have been describd what are at present considered to be the preferred embodiments of the present invention, it will be obvious to those skilled in the art that various changes and modifications may be made therein without departing from the invention and it is, therefore, aimed to cover all such changes and modifications as fall within the true spirit and scope of the invention.

What is claimed is:

1. A chromatographic column for the separation of components of a mixture comprising:
    a hollow member;
    a randomly intertwined structure of fibers positioned within said hollow member, said fibers coated with a substance with which the different components of said mixture have different attractions,
    means including a carrier fluid for flowing a sample into said column, and
    means to detect the separated components eluting from said column.

2. A chromatographic column for the separation of components of a mixture comprising:
    a hollow member;
    a randomly interlocked structure of metal fibers positioned within said hollow member, said fibers holding a substance with which the different components of said mixture have different attractions,
    means including a carrier fluid for flowing a sample into said column, and
    means to detect the separated components eluting from said column.

3. A chromatographic column for the separation of components of a mixture comprising:
    a hollow member;
    a randomly interlocked structure of sintered metal fibers positioned within said hollow member, said fibers coated with a substance with which the different components of said mixture have different attractions,
    means including a carrier fluid for flowing a sample into said column, and
    means to detect the separated components eluting from said column.

4. A chromatographic column for the separation of components of a mixture comprising:
    a tubular member;
    a randomly intertwined structure of fibers positioned within said tubular member and having substantially the same physical size as the inside volume of said tubular member, said fibers holding a substance with which the different components of said mixture have different attractions,
    means including a carrier fluid for flowing a sample into said column, and
    means to detect the separated components eluting from said column.

5. A chromatographic column for the separation of components of a mixture comprising:
 a tubular member;
 a randomly interlocked structure of fibers positioned within said tubular member and having substantially the same physical size as the inside volume of said tubular member, said fibers coated with a substance with which the different components of said mixture have different attractions,
 means including a carrier fluid for flowing a sample into said column, and
 means to detect the separated components eluting from said column.

6. A chromatographic column for the separation of components of a mixture comprising:
 a tubular member;
 a randomly interlocked structure of sintered metal fibers positioned within said tubular member and having substantially the same physical size as the inside volume of said tubular member, said fibers coated with a substance with which the different components of said mixture have different attractions,
 means including a carrier fluid for flowing a sample into said column, and
 means to detect the separated components eluting from said column.

7. A chromatographic column for the separation of components of a mixture of gases and vapors by stationary phase-moving phase elution chromatography comprising:
 a hollow member;
 a randomly intertwined structure of fibers positioned within said hollow member, said fibers coated with the stationary phase comprising a substance with which the different components of the moving phase have different attractions,
 means including a carrier fluid for flowing a sample into said column, and
 means to detect the separated components eluting from said column.

8. A chromatographic column for the separation of components of a mixture comprising:
 a tubular member;
 a randomly intertwined structure of fibers positioned within said tubular member and occupying substantially the entire inside volume of said tubular member, said fibers holding a substance with which the different components of said mixture have different attractions,
 means including a carrier fluid for flowing a sample into said column, and
 means to detect the separated components eluting from said column.

9. A chromatographic column for the separation of components of a mixture comprising:
 a tubular member;
 a randomly intertwined structure of fibers in the form of a hollow cylinder positioned within said tubular member, said fibers holding a substance with which the different components of said mixture have different attractions,
 means including a carrier fluid for flowing a sample into said column, and
 means to detect the separated components eluting from said column.

References Cited by the Examiner

UNITED STATES PATENTS

| 1,483,379 | 2/1924 | Reed | 55—524 X |
| 1,841,347 | 1/1932 | Tuttle | 55—524 X |
| 2,178,614 | 11/1939 | Slayter | 55—524 |
| 2,826,265 | 3/1958 | DeWoody | 55—523 X |
| 3,007,544 | 11/1961 | Staunt | 55—523 |

FOREIGN PATENTS 548,737  4/1932  Germany.

REUBEN FRIEDMAN, *Primary Examiner.*

C. N. HART, *Assistant Examiner.*